US012753586B1

(12) United States Patent
Douglas

(10) Patent No.: US 12,753,586 B1
(45) Date of Patent: Oct. 6, 2026

(54) GARDEN HOSE EXTENSION KIT

(71) Applicant: Kenneth Douglas, Pompano Beach, FL (US)

(72) Inventor: Kenneth Douglas, Pompano Beach, FL (US)

( * ) Notice: Subject to any disclaimer, the term of this patent is extended or adjusted under 35 U.S.C. 154(b) by 0 days.

(21) Appl. No.: 19/357,184

(22) Filed: Oct. 14, 2025

(51) Int. Cl.
*E03B 7/04* (2006.01)
*E03B 7/07* (2006.01)
*F16L 33/24* (2006.01)

(52) U.S. Cl.
CPC .................. *E03B 7/04* (2013.01); *E03B 7/07* (2013.01); *F16L 33/24* (2013.01)

(58) Field of Classification Search
CPC ............... F16L 33/24; E03B 7/04; E03B 7/07
See application file for complete search history.

(56) References Cited

U.S. PATENT DOCUMENTS 5,983,419 A * 11/1999 Carroll .................. A47K 3/285 4/615
6,202,594 B1 3/2001 Kirschner
6,276,399 B1 8/2001 Fox
6,345,397 B1 * 2/2002 Haubrich .................. E03C 1/04 4/615
6,561,810 B1 * 5/2003 Schellhardt ............ G09B 23/12 434/300
7,114,202 B1 * 10/2006 Padrick ................. E03C 1/0408 4/615
7,174,921 B1 2/2007 Wiltse
10,385,551 B1 * 8/2019 Koshel .................... F16L 33/08
D919,061 S 5/2021 Feng
11,873,627 B2 * 1/2024 Storey ..................... E03B 7/003
D1,085,365 S 7/2025 Cai
2007/0274783 A1 11/2007 Hibbard
2016/0017576 A1 1/2016 Simmons

FOREIGN PATENT DOCUMENTS

CA 2218577 5/1998

* cited by examiner

*Primary Examiner* — James M Hewitt, II

(57) ABSTRACT

The garden hose extension kit may include a relocated faucet head, an extension hose, and an adapter. The proximal end of the extension hose may connect to an existing building spigot. The distal end of the extension hose may connect to the relocated faucet head via the adapter. A garden hose may connect to the relocated faucet head at a location that is remote from the existing building spigot. The relocated faucet head May comprise a shut-off valve such that the flow of water through the garden hose may be started and stopped without approaching the existing building spigot.

16 Claims, 3 Drawing Sheets

GARDEN HOSE EXTENSION KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of garden hoses and gardening equipment, more specifically, a garden hose extension kit.

SUMMARY OF INVENTION

The garden hose extension kit may comprise a relocated faucet head, an extension hose, and an adapter. The proximal end of the extension hose may connect to an existing building spigot. The distal end of the extension hose may connect to the relocated faucet head via the adapter. A garden hose may connect to the relocated faucet head at a location that is remote from the existing building spigot. The relocated faucet head May comprise a shut-off valve such that the flow of water through the garden hose may be started and stopped without approaching the existing building spigot.

An object of the invention is to provide a relocated faucet head that may be positioned at a location that is remote from an existing building spigot.

Another object of the invention is to provide a connector on the relocated faucet head such that a garden hose may be coupled to the relocated faucet head.

A further object of the invention is to provide an extension hose that may route water from the existing spigot to the relocated faucet head.

Yet another object of the invention is to provide an adapter for coupling the extension hose to the relocated faucet head.

These together with additional objects, features and advantages of the garden hose extension kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the garden hose extension kit in detail, it is to be understood that the garden hose extension kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the garden hose extension kit.

It is therefore important that the claims be regarded as including such equivalent construction insofar as they do not depart from the spirit and scope of the garden hose extension kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
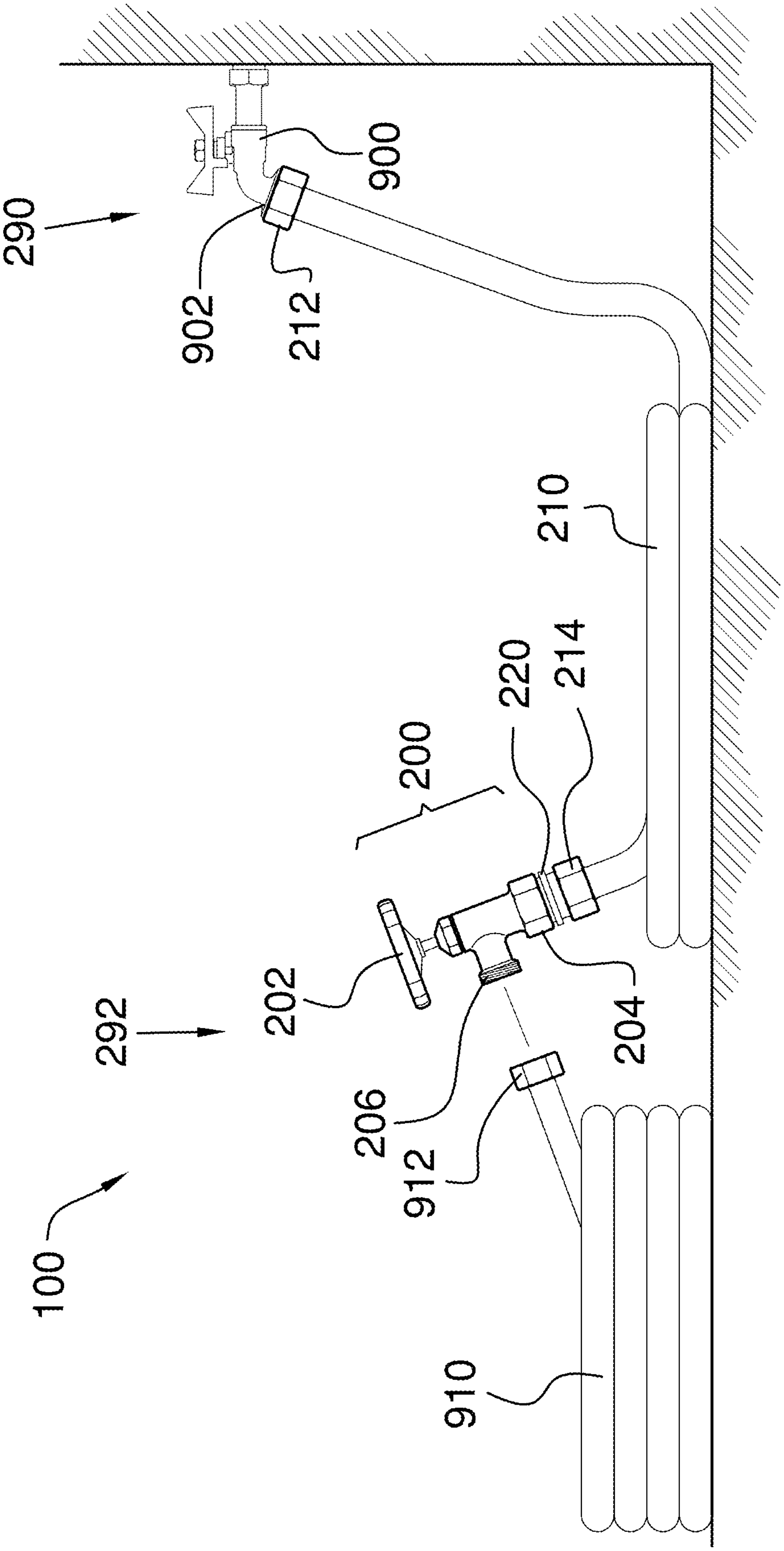
FIG. 1 is an in-use view of an embodiment of the disclosure, illustrating an extension hose that is a flexible hose.
Figure 2:
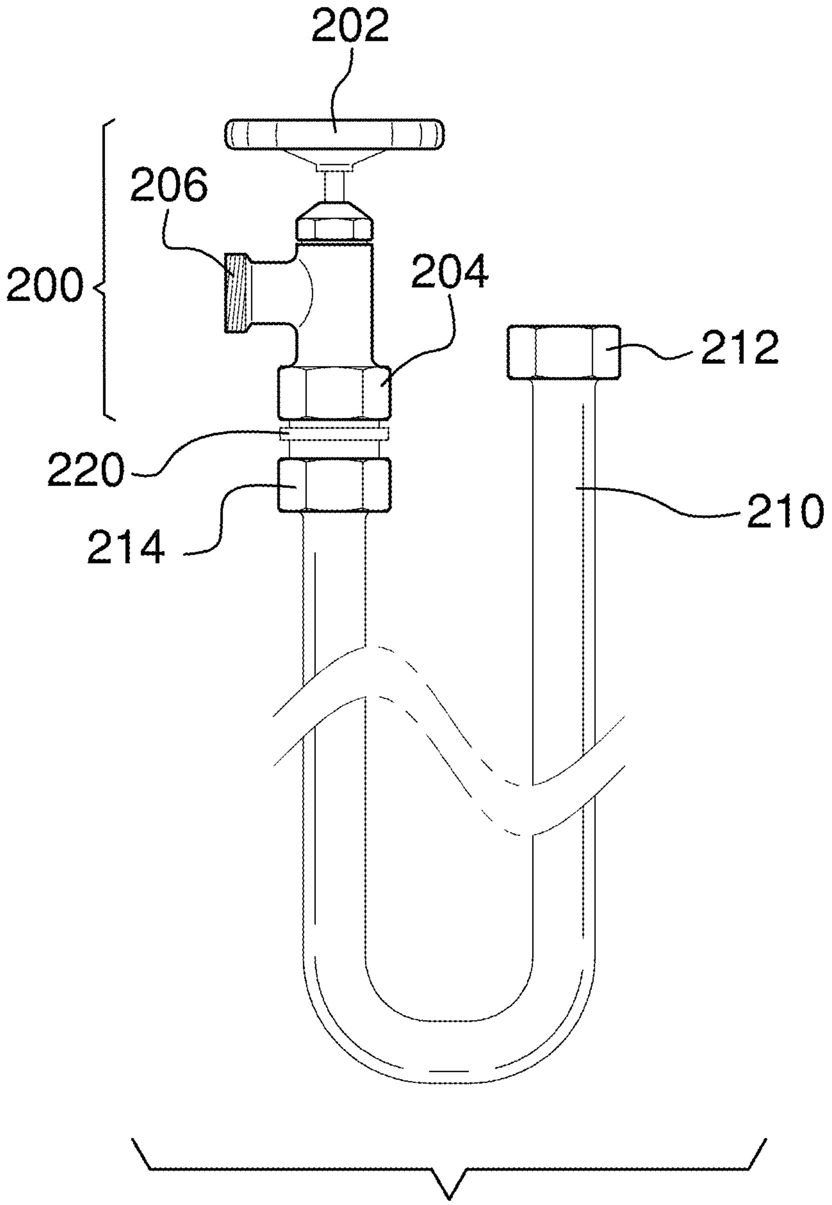
FIG. 2 is a side view of an embodiment of the disclosure, illustrating an extension hose that is a rigid hose.
Figure 3:
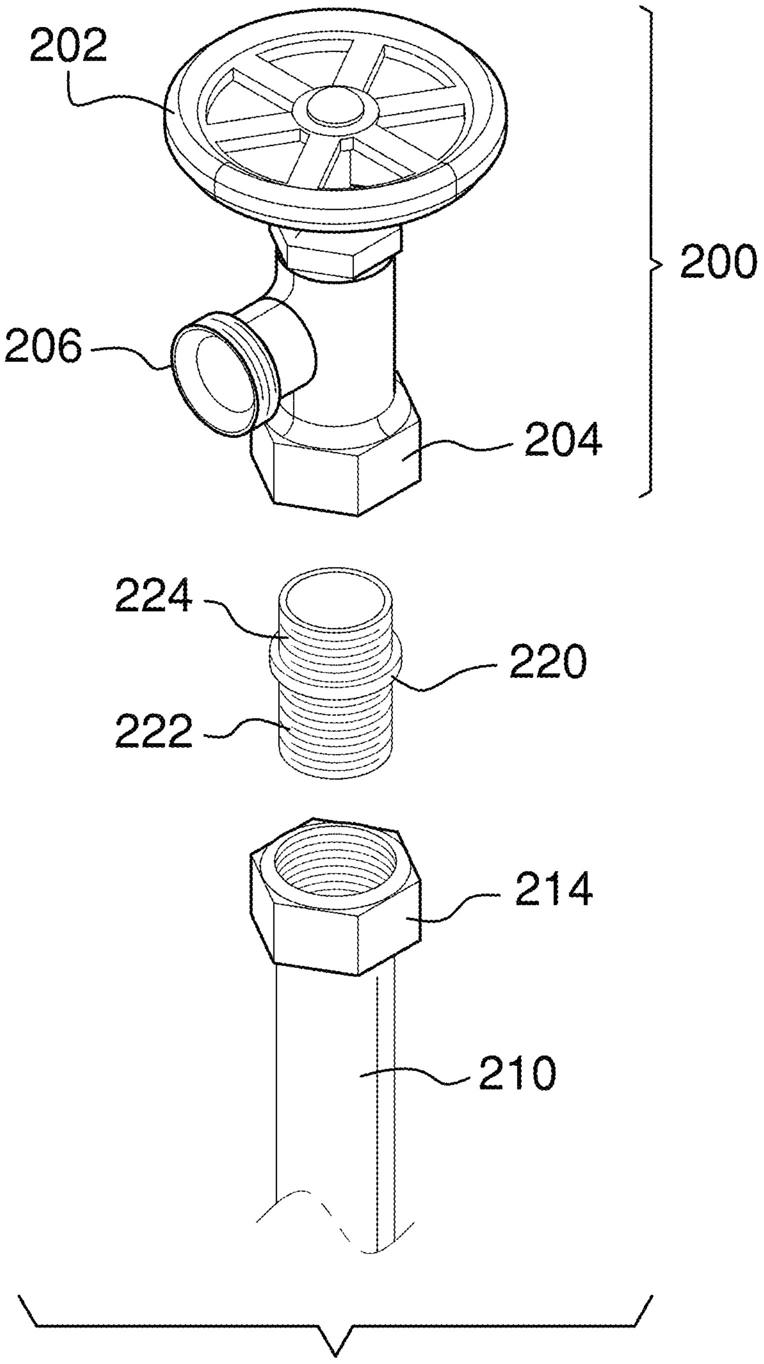
FIG. 3 is an exploded view of an embodiment of the disclosure, illustrating the adapter.

Detailed reference will now be made to a first potential embodiment of the disclosure, which is illustrated in FIGS. 1 through 3.

The garden hose extension kit 100 (hereinafter invention) comprises a relocated faucet head 200, an extension hose 210, and an adapter 220. The proximal end 290 of the extension hose 210 may connect to an existing building spigot 900. The distal end 292 of the extension hose 210 may connect to the relocated faucet head 200 via the adapter 220. A garden hose 910 May connect to the relocated faucet head 200 at a location that is remote from the existing building spigot 900. The relocated faucet head 200 may comprise a shut-off valve 202 such that the flow of water through the garden hose 910 may be started and stopped without approaching the existing building spigot 900.

The relocated faucet head 200 may comprise a faucet head female connector 204 and a faucet head male connector 206. The faucet head female connector 204 and the faucet head male connector 206 may be fluidly coupled within the relocated faucet head 200 such that water flowing into the relocated faucet head 200 through the faucet head female connector 204 may flow out of the relocated faucet head 200 through the faucet head male connector 206. The relocated faucet head 200 may comprise the shut-off valve 202. The shut-off valve 202 may be opened and closed to permit or prevent the flow of water through the relocated faucet head 200.

The shut-off valve 202 may be moved to an open position to permit the flow of water through the relocated faucet head 200. The shut-off valve 202 may be moved to a closed position to prevent the flow of water through the relocated faucet head 200. In a preferred embodiment, the relocated faucet head 200 may be a right-angle hose valve.

The extension hose 210 may transfer the water from the existing building spigot 900 to the relocated faucet head 200. The extension hose 210 may comprise a first extension hose female connector 212 and a second extension hose female 11 connector 214. The first extension hose female connector 212 May be coupled to a spigot male connector 902 on the existing 13 building spigot 900. The second extension hose female connector 214 may be coupled to the relocated faucet head 200 via the adapter 220.

In some embodiments, the extension hose 210 may be a flexible hose. As a non-limiting example, the extension hose 210 may be made of synthetic rubber, polyvinyl chloride (PVC), or polyurethane. In some embodiments, the extension hose 210 may comprise an internal reinforcement layer of braided or knitted polyester fibers for strength.

In some embodiments, the extension hose 210 may be a rigid pipe. The rigid pipe may be operable to create a permanent installation. As a non-limiting example, the rigid pipe may be installed from the existing building spigot 900 out into a garden area which will be watered frequently. As non-limiting examples, the rigid pipe may be made of polyvinyl chloride (PVC) or cross-linked polyethylene (PEX).

In a preferred embodiment, the extension hose 210 may have an end-to-end length of 3 ft, 6 ft, or 10 ft.

The adapter 220 may be a double-male fitting that adapts the extension hose 210 to couple with the relocated faucet head 200. The adapter 220 may comprise a first adapter male connector 222 and a second adapter male connector 224 that are fluidly coupled such that water may flow through the adapter 220 from the first adapter male connector 222 to the second adapter male connector 224. The first adapter male connector 222 may be coupled to the second extension hose female connector 214 on the extension hose 210. The second adapter male connector 224 may be coupled to the faucet head female connector 204 on the relocated faucet head 200.

In some embodiments, the first extension hose female connector 212, the faucet head male connector 206, or both may be quick connectors.

In use, if the extension hose 210 is not already be coupled to the relocated faucet head 200 via the adapter 220, couple the second adapter male connector 224 to the faucet head female connector 204 and couple the second extension hose female connector 214 to the first adapter male connector 222. Then, Couple the first extension hose female connector 212 to the spigot male connector 902.

Couple a garden hose female connector 912 to the faucet head male connector 206.

Turn the flow of water off at the relocated faucet head 200.

Turn the flow of water on at the existing building spigot 900.

From then on, control the flow of water into the garden hose 910 using the shut-off valve 202 on the relocated faucet head 200.

Definitions

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, "flexible" may refer to an object or material which will deform when a force is applied to it, which will not return to its original shape when the deforming force is removed, and which may not retain the deformed shape caused by the deforming force.

As used in this disclosure, a "kit" may be an assembly of a combination of instruments, equipment, tools, supplies, or combinations thereof that are dedicated or intended for use in a specific purpose. Depending on the context, a kit may further include the container within which the instruments, equipment, tools, and supplies are stored.

As used in this disclosure, a "quick connect fitting" or "quick connector", also known as a "quick disconnect fitting", is a coupling that is used in fluid flow applications to connect or disconnect two lines or two objects through which fluids will flow by hand and without the use of tools.

As used herein, "rigid" may refer to an object or material which is inflexible.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A garden hose extension kit comprising:

a relocated faucet head, an extension hose, and an adapter;

wherein the proximal end of the extension hose connects to an existing building spigot;
wherein the distal end of the extension hose connects to the relocated faucet head via the adapter;
wherein a garden hose connects to the relocated faucet head at a location that is remote from the existing building spigot;
wherein the relocated faucet head comprises a shut-off valve such that the flow of water through the garden hose is started and stopped without approaching the existing building spigot;
wherein the relocated faucet head comprises a faucet head female connector and a faucet head male connector;
wherein the shut-off valve is opened and closed to permit or prevent the flow of water through the relocated faucet head;
wherein the extension hose transfers the water from the existing building spigot to the relocated faucet head;
wherein the extension hose comprises a first extension hose female connector and a second extension hose female connector;
wherein the adapter is a double-male fitting that adapts the extension hose to couple with the relocated faucet head.

2. The garden hose extension kit according to claim 1 wherein the faucet head female connector and the faucet head male connector are fluidly coupled within the relocated faucet head such that water flowing into the relocated faucet head through the faucet head female connector flows out of the relocated faucet head through the faucet head male connector.

3. The garden hose extension kit according to claim 2 wherein the shut-off valve is moved to an open position to permit the flow of water through the relocated faucet head;
wherein the shut-off valve is moved to a closed position to prevent the flow of water through the relocated faucet head.

4. The garden hose extension kit according to claim 3 wherein the relocated faucet head is a right-angle hose valve.

5. The garden hose extension kit according to claim 4 wherein the first extension hose female connector is coupled to a spigot male connector on the existing building spigot.

6. The garden hose extension kit according to claim 5 wherein the second extension hose female connector is coupled to the relocated faucet head via the adapter.

7. The garden hose extension kit according to claim 6 wherein the extension hose is a flexible hose.

8. The garden hose extension kit according to claim 7 wherein the extension hose is made of synthetic rubber, polyvinyl chloride, or polyurethane.

9. The garden hose extension kit according to claim 8 wherein the extension hose comprises an internal reinforcement layer of braided or knitted polyester fibers for strength.

10. The garden hose extension kit according to claim 6 wherein the extension hose is a rigid pipe;
wherein the rigid pipe is operable to create a permanent installation.

11. The garden hose extension kit according to claim 10 wherein the rigid pipe is made of polyvinyl chloride or cross-linked polyethylene.

12. The garden hose extension kit according to claim 6 wherein the extension hose has an end-to-end length of 3 ft, 6 ft, or 10 ft.

13. The garden hose extension kit according to claim 6 wherein the adapter comprises a first adapter male connector and a second adapter male connector that are fluidly coupled such that water flows through the adapter from the first adapter male connector to the second adapter male connector.

14. The garden hose extension kit according to claim 13 wherein the first adapter male connector is coupled to the second extension hose female connector on the extension hose.

15. The garden hose extension kit according to claim 14 wherein the second adapter male connector is coupled to the faucet head female connector on the relocated faucet head.

16. The garden hose extension kit according to claim 15 wherein the first extension hose female connector, the faucet head male connector, or both are quick connectors.

* * * * *